United States Patent [19]
Sakuma et al.

[11] Patent Number: 5,240,197
[45] Date of Patent: Aug. 31, 1993

[54] SELECTIVELY ENGAGEABLE TAPE WINDING SHAFT AND METHOD OF USE

[75] Inventors: Yuji Sakuma; Yasunori Uchikawa, both of Chohu, Japan

[73] Assignee: Otari Inc., Tokyo, Japan

[21] Appl. No.: 710,692

[22] Filed: Jun. 5, 1991

[30] Foreign Application Priority Data

Jun. 14, 1990 [JP] Japan ................................. 2-156712

[51] Int. Cl.[5] .................... B65H 19/20; B65H 18/08
[52] U.S. Cl. .................................. 242/56 R; 242/68.1
[58] Field of Search .................... 242/56 R, 199, 200, 242/201, 68, 68.1, 68.2; 403/1

[56] References Cited

U.S. PATENT DOCUMENTS

| | | | |
|---|---|---|---|
| 2,553,835 | 5/1951 | Sachs | 242/68.1 |
| 4,114,252 | 9/1978 | Kon et al. | 242/56 R X |
| 4,599,130 | 7/1986 | Woodley | 242/56 R X |
| 4,699,328 | 10/1987 | Kreeft et al. | 242/56 R |
| 4,854,517 | 8/1989 | Watanabe et al. | 242/56 R |

FOREIGN PATENT DOCUMENTS 131469 2/1982 Japan .

Primary Examiner—Daniel P. Stodola
Assistant Examiner—John Rollins
Attorney, Agent, or Firm—David O'Reilly

[57] ABSTRACT

An apparatus and method for winding a magnetic tape into a cassette. The apparatus provides a simple construction that allows a leader tape to be smoothly and quickly withdrawn from the cassette. The apparatus has a motor mounted on a base panel with a winding shaft for engaging the hub of the cassette mounted on the spindle of the motor. A spring-loaded retractable pawl is mounted in a groove in the winding shaft. When extended by the spring, the pawl engages the hub of the cassette to wind magnetic tape into the cassette. The hub is released by retracting the pawl into the groove of the winding shaft with a reciprocally movable pressing plate mounted perpendicular to the axis of the winding shaft that engages the end of the pawl.

2 Claims, 3 Drawing Sheets

SELECTIVELY ENGAGEABLE TAPE WINDING SHAFT AND METHOD OF USE

FIELD OF THE INVENTION

The present invention relates to a method and apparatus for winding magnetic tape, and more particularly concerns a method and apparatus for winding magnetic tape fed out of a supply reel having a long tape into a cassette.

BACKGROUND OF THE INVENTION

A magnetic tape winding apparatus is known that can feed magnetic tape out of a supply reel having a long tape wound therein, and wind it on a cassette. The tape winding apparatus supplies a cassette from a cassette magazine into a cassette holder, and insert a winding shaft into a hub of the cassette. It pulls a leader tape out of the cassette, cuts the leader tape, and splices an end of the cut leader tape to the side of the winding shaft with an end of the magnetic tape fed out. It revolves the winding shaft and the supply reel to wind the magnetic tape into the cassette to a predetermined length, and stops the winding shaft and the supply reel. The apparatus then cuts the magnetic tape, and splices the remaining end of the cut leader tape to the other end of the magnetic tape on the side of the winding shaft. It then winds a little of the magnetic tape and the leader tape outside the cassette into the cassette with the winding shaft, and ejects the completed cassette.

The winding shaft has been known to have a pawl or similar projection on a circumference thereof so that it can fit in a groove in a center hole of the hub. The pawl is turnably held on a support provided in a groove on the winding shaft and is supported by a spring. The pawl, which is usually out of the winding shaft, can be concealed in the winding shaft by an external force exerted on the pawl. This facilitates easy insertion of the winding shaft in the hub.

As for construction and operation of the winding shaft, these have been disclosed, for example, in Japanese Utility Model Publicity S58-131469. In this prior art, the pawl is actuated from the center of the winding shaft by a cone rod. To insert the hub into or pull it out of the winding shaft, the pawl is pushed into the winding shaft. To revolve the winding shaft to wind the magnetic tape, the pawl projects out of the winding shaft to fit in the groove of the center hole of the hub. This prevents an insertion error that may occasionaly occur when the hub is inserted into the winding shaft.

However, the magnetic tape winding apparatus and method heretofore used have the disadvantage of scratching the leader tape when an audio magnetic tape and similar thin magnetic tapes are wound, or when the leader tape is pulled out of the cassette. This is due to the fact that with the pawl in the groove of the center hole of the hub when the leader tape is pulled out by an external force, the leader tape has the inertia force of the motor connected with the winding shaft exerted on it. This inertia force can cause the tape to rub against surfaces it is in contact with when the tape is quickly accelerated or decelerated.

In view of the foregoing, it is a general object of the present invention to provide a magnetic tape winding method and apparatus that is simple in operation and construction to pull a leader tape out of a cassette smoothly in a short time without scratching the tape.

BRIEF DESCRIPTION OF THE INVENTION

In order to accomplish the above mentioned object, the magnetic tape winding apparatus according to the present invention is constructed so that the end of a pawl can be typically made to project out of a winding shaft by the force of a spring. The end of the pawl can be withdrawn into a winding shaft by the back end of the pawl being pressed by a plate.

In a winding step for the magnetic tape, in which the end of the pawl is in the winding shaft, a hub can be inserted onto the winding shaft to pull the leader tape out. After that, the plate can be returned to its home position to extend the pawl out of the winding shaft to fit the groove of a center hole of the hub.

The magnetic tape winding apparatus and method according to the present operates as follows. The leader tape can be pulled out when the pawl is in the winding shaft. At this time, the winding shaft cannot revolve, but only the hub can rotate. For this reason, a strong force is not exerted an the leader tape so that it can be pulled out smoothly without scratching the tape.

These and other objects and nobel features of the present invention will be better understood upon consideration of the following detailed description of an embodiment and the accompanying drawings.

DETAILED DESCRIPTION OF THE INVENTION

Figure 1:
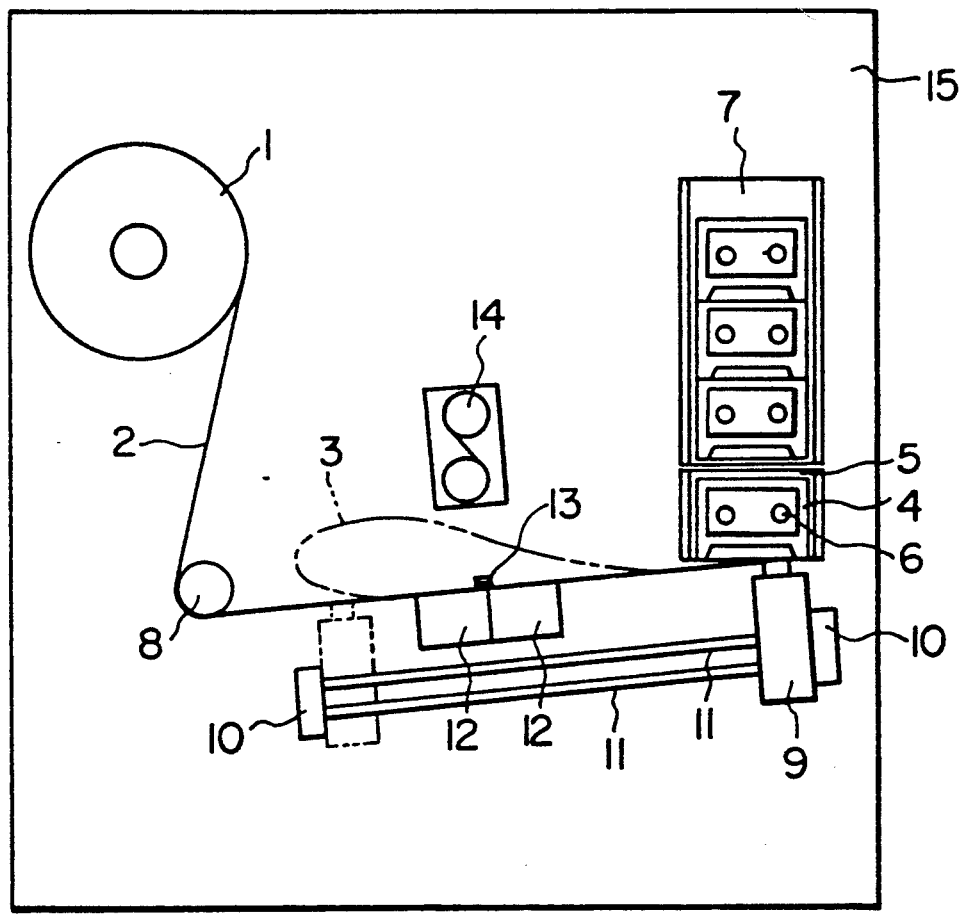
FIG. 1 is an overall front view illustrative of the magnetic tape winding apparatus of the present invention.
Figure 2:
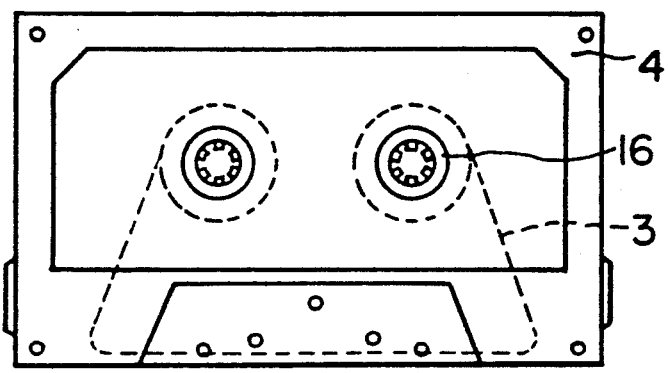
FIG. 2 is a brief front view illustrative of a cassette having leader tape wound therein.

FIG. 1 is a schematic representation of an illustrative embodiment of the present invention for an magnetic tape winding apparatus. This apparatus features supply reel 1 having long magnetic tape 2 wound thereon rotatably driven to feed magnetic tape 2 out. Magnetic tape 2 is wound on hub 16 of cassette 4 with winding shaft 6 rotatably driven. The apparatus comprises a supply means for feeding magnetic tape 2 out of supply reel 1, cassette supply means for supplying cassette 4 from cassette magazine 7 to cassette holder 5, and a leader tape pull-out means for pulling leader tape 3 out of cassette 4 having leader tape 3 fitted thereto. Cutting means is provided for cutting leader tape 3 and magnetic tape 2, pulled out and a splicing means for splicing leader tape 3 and magnetic tape 2. Winding means windS magnetic tape 2 on hub 16 of cassette 4, and a discharge means (not shown) discharges cassette 4 from cassette holder 5 with magnetic tape 2 wound therein.

Figure 3:
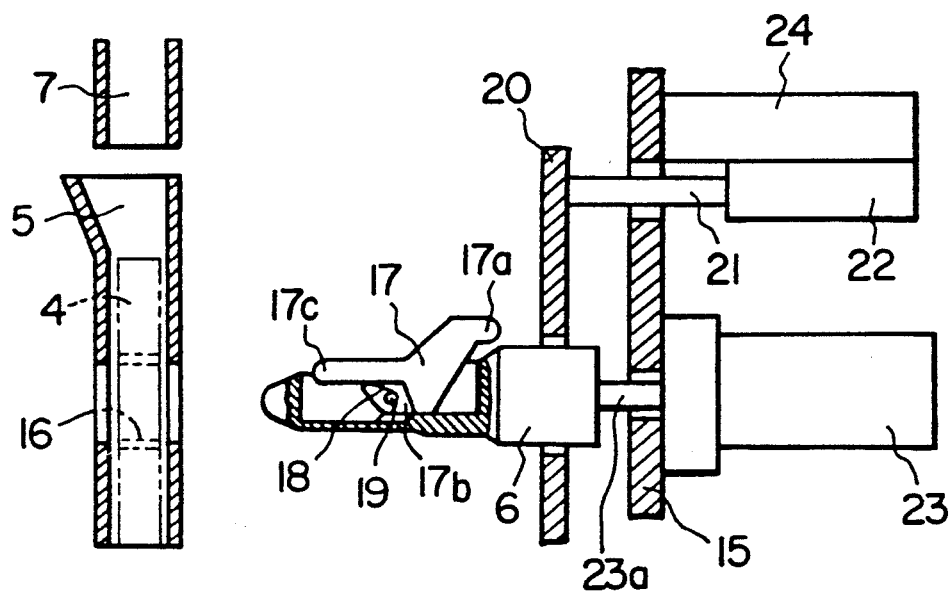
FIGS. 3 and 4 are longitudinal cross sectional views of a winding means.
Figure 4:
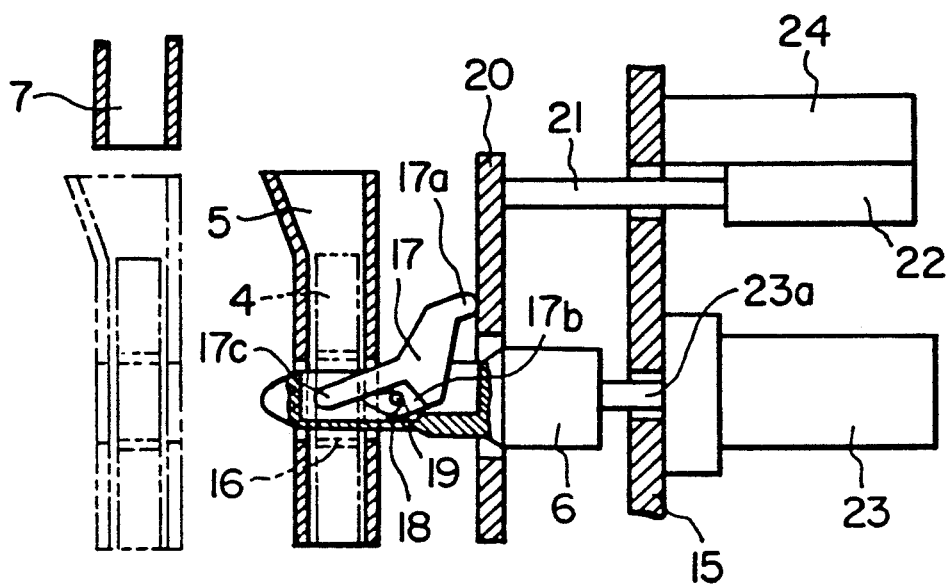
Figure 5:
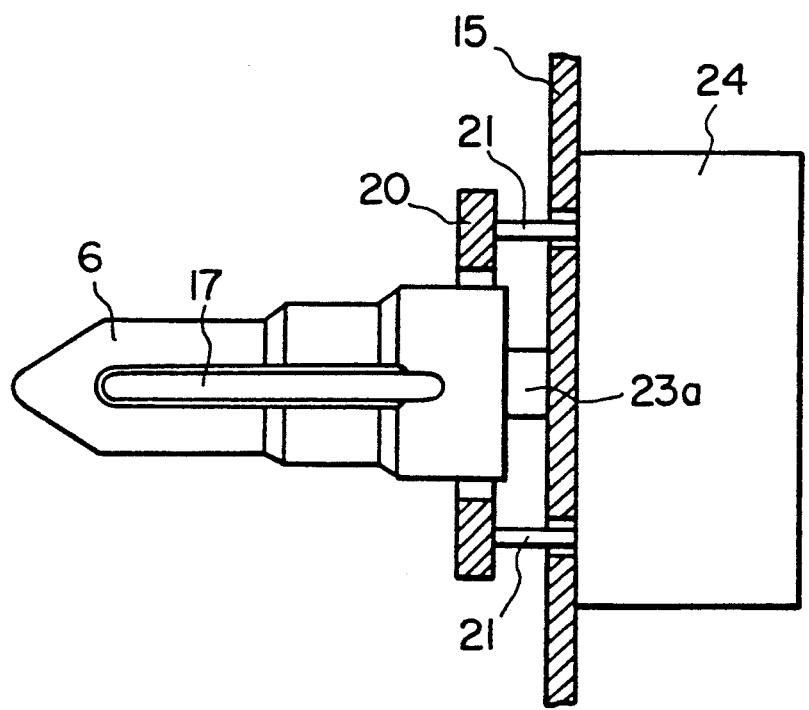
FIG. 5 is a lateral parial cross sectional view of the winding means.

The following describes construction of the winding means with reference to FIGS. 3, 4, and 5. The winding means comprises motor 23 fixed on the inside of base panel 15, winding shaft 6 fixed on spindle 23a of motor 23, pawl 17 held by the fulcrum of support 19 to be turned by spring 18 in a groove of winding shaft 6, and pressing plate 20. Pawl 17 is a plate a little thinner than the width of a groove formed by a small hole in hub 16, and has a spring fitting portion 17b and circular portion 17a contacting pressing plate 20 which forms a T shape.

Base panel 15 has pressing plate drive 24 mounted thereon, which has twin cylinder 22 having two rods in parallel mounted thereon. Two shafts 21 of the twin cylinder 22 have pressing plate 20 mounted thereon. Pressing plate 20 can be reciprocally moved perpendicular to the base panel 15 by the twin cylinder 22.

Pawl 17 can be set in either of two positions as shown in FIGS. 3 and 4. In pressing plate 20 is positioned near the side of base panel 15, pressing plate 20 is separated from pawl 17. A edge 17c of the pawl 17, as shown in FIG. 3, is extended out of winding shaft 6 by the force of spring 18. When hub 16 is inserted into winding shaft 6, pawl 17 enters the groove of the center hole of hub 16. Hub 16 also can rotate with winding shaft 6. In the second position shown in FIG. 4 pressing plate 20 is separated a distance from base panel 15, pressing plate 20 presses circular portion 17a to slightly turn pawl 17 around support 19. In this position, edge 17c of pawl 17, as shown in FIG. 4, is concealed in winding shaft 6. As hub 16 is inserted in winding shaft 6, hub 16 cannot rotate even when winding shaft 6 revolves. Conversely, winding shaft 6 cannot rotate even when hub 16 revolves.

In turn, the following describes the winding process.

(1) Cassette 4 is supplied from cassette magazine 7 to the cassette holder 5 positioned apart from base panel 15 (cassette supply step). Cassette holder 5 is fitted so as to move reciprocally perpendicular to base panel 15 though this is not shown.

(2) Pressing plate 20 is separated a distance from base panel 15, and pawl 17 is in state B.

(3) Cassette holder 5 moves toward base panel 15. Hub 16 is then inserted onto winding shaft 6.

(4) Leader tape 3 is pulled out of cassette 4 little by a leader tape pull-out arrangement 9 provided so as to be reciprocally moved along two slide rods 11 mounted in parallel on blocks 10 mounted on base panel 15. In this step (leader tape pull-out step), leader tape pull-out arrangement 9 is at its rightmost position.

(5) Leader tape pull-out arrangement 9 moves to the leftmost position along slide rods 11 to pull out leader tape 3 to a predetermined length. In this step (leader tape pull-out step), leader tape 3 is positioned on shift blocks 12.

(6) Pressing plate 20 is positioned near the side of base panel 15, and pawl 17 is made to be in state A.

(7) Leader tape 3 is cut on shift blocks 12 by cutter 13 (cutting step).

(8) Magnetic tape 2 placed on shift blocks 12 in advance is spliced with an end of cut leader tape 3 on the side of the winding shaft 6 by splicing arrangement 14 (splicing step).

(9) Winding shaft 6 and supply reel 1 are removed to wind the magnetic tape 2 into cassette 4 (winding step).

(10) When magnetic tape 2 is wound in cassette 4 to a predetermined length, winding shaft 6 and supply reel 1 are stopped.

(11) Magnetic tape 2 is cut on shift blocks 12 by cutter 13 (cutting step).

(12) The other end of cut leader tape 3 is spliced with one end of cut magnetic tape 2 on the side of cassette 4 by the splicing arrangement 14 (splicing step).

(13) Leader tape 3 and magnetic tape 2 outside of cassette 4 are wound into cassette 4 by revolving winding shaft 6 (winding step).

(14) Cassette 4 having magnetic tape 2 wound therein is ejected from cassette holder 5 by an ejection arrangement (not shown).

The above described steps are automatically repeated to produce a cassette having a magnetic tape wound therein.

The advantages of the present invention consist in particular in the fact that a magnetic tape winding apparatus can be produced with a simple construction to pull a leader tape out of a cassette smoothly and quickly without scratching the tape, and this assures the production of quality cassette in a short cycle.

We claim:

1. A magnetic tape winding apparatus for winding magnetic tape into a cassette comprising; a magnetic tape supply reel; cassette supply means; a winding shaft constructed to engage a hub in said cassette said hub having a leader tape wound thereon; a retractable pawl on said winding shaft; spring means biasing said pawl in an extended position; a motor constructed and arranged to drive said winding shaft; a pressing plate perpendicular to the axis of said winding shaft, said pressing plate having a hole, said winding shaft passing through said hole in said pressing plate; cylinder means for reciprocally moving said pressing plate parallel to the axis of said winding shaft; said pressing plate constructed and arranged to engage an end of said pawl; whereby said pressing plate engages and retracts said pawl into said winding shaft when said pressing plate is moved parallel to the axis of said winding shaft allowing said hub to rotate freely about said winding shaft and said leader tape to be smoothly pulled out of said cassette.

2. A method of winding magnetic tape into a cassette comprising; loading an empty cassette having a leader tape from a cassette magazine; engaging a hub in said cassette with a winding shaft having a pawl retractable into said shaft; positioning a pressing plate adjacent to said winding shaft and an end of said pawl, said pressing plate being arranged perpendicular to the axis of said winding shaft; moving said pressing plate parallel to the axis of said winding shaft to engage the end of said pawl to retract said pawl into said winding shaft to release said hub; pulling said leader tape smoothly out of said cassette; cutting said leader tape; feeding magnetic tape into said cassette from a supply reel; splicing said leader tape to said magnetic tape; releasing said retractable pawl by withdrawing said pressing means allowing said pawl to re-engage said hub; winding said magnetic tape into said cassette; ejecting said cassette when full of magnetic tape.

* * * * *